(12) United States Patent
Lee

(10) Patent No.: US 12,198,692 B2
(45) Date of Patent: Jan. 14, 2025

(54) DISPLAY APPARATUS

(71) Applicant: LG ELECTRONICS INC., Seoul (KR)

(72) Inventor: Jaekyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 297 days.

(21) Appl. No.: 17/641,068

(22) PCT Filed: Sep. 6, 2019

(86) PCT No.: PCT/KR2019/011550
§ 371 (c)(1),
(2) Date: Mar. 7, 2022

(87) PCT Pub. No.: WO2021/045278
PCT Pub. Date: Mar. 11, 2021

(65) Prior Publication Data
US 2022/0343909 A1 Oct. 27, 2022

(51) Int. Cl.
*G10L 15/00* (2013.01)
*G10L 15/22* (2006.01)
*G10L 15/30* (2013.01)

(52) U.S. Cl.
CPC ............. *G10L 15/22* (2013.01); *G10L 15/30* (2013.01)

(58) Field of Classification Search
None
See application file for complete search history.

(56) References Cited

U.S. PATENT DOCUMENTS

| 2018/0210703 A1 | 7/2018 | Meyers et al. |
| 2019/0267004 A1* | 8/2019 | Lee ............ G06V 40/174 |
| 2020/0013407 A1 | 1/2020 | Chae |

FOREIGN PATENT DOCUMENTS

| CN | 112513833 B * | 7/2024 | ......... G06F 16/3343 |
| KR | 1020170056586 | 5/2017 | |
| KR | 102389594 B1 * | 8/2017 | |

(Continued)

OTHER PUBLICATIONS

PCT International Application No. PCT/KR2019/011550, International Search Report dated May 28, 2020, 4 pages.

(Continued)

*Primary Examiner* — Shreyans A Patel
(74) *Attorney, Agent, or Firm* — LEE, HONG, DEGERMAN, KANG & WAIMEY

(57) ABSTRACT

A display device according to an embodiment of the present disclosure may include display unit; a wireless communication unit configured to wirelessly communicate with the home appliance; and a control unit configured to: receive a voice command, obtain the intention of the received voice command, identify one or more home appliances associated with the obtained intention, receive state information of the one or more home appliances from the identified one or more home appliances through the wireless communication unit, based on the received state information, obtain recommended operation information of the identified one or more home appliances, and display intention analysis information, the state information, and the recommended operation information, which are the analysis results of the intention, on the display unit.

15 Claims, 15 Drawing Sheets

(56) References Cited

FOREIGN PATENT DOCUMENTS

| KR | 20190008480 | | 1/2019 | | |
|----|-------------|---|--------|---|---|
| KR | 1020190014569 | | 2/2019 | | |
| KR | 1020190026521 | | 3/2019 | | |
| KR | 20190042903 | | 4/2019 | | |
| KR | 20190070906 | A * | 6/2019 | | |
| KR | 1020190065200 | | 6/2019 | | |
| WO | WO-2015088141 | A1 * | 6/2015 | ............... | G06F 3/00 |
| WO | 2019050227 | | 3/2019 | | |
| WO | 2019136065 | | 7/2019 | | |
| WO | WO-2019136065 | A1 * | 7/2019 | ............. | G06F 3/165 |

OTHER PUBLICATIONS

European Patent Office Application Serial No. 19944542.0, Search Report dated Apr. 18, 2023, 3 pages.
European Patent Office Application Serial No. 19944542.0, Search Report dated Jul. 14, 2023, 2 pages.

\* cited by examiner

FIG. 13
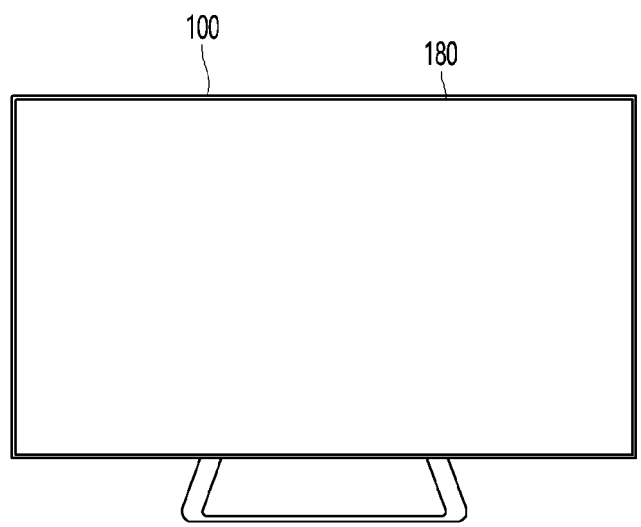
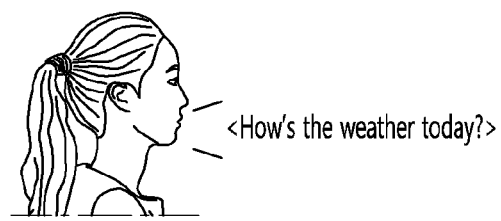

DISPLAY APPARATUS

CROSS-REFERENCE TO RELATED APPLICATIONS

This application is the National Stage filing under 35 U.S.C. 371 of International Application No. PCT/KR2019/011550, filed on Sep. 6, 2019, the contents of which are all incorporated by reference herein in its entirety.

TECHNICAL FIELD

The present disclosure is a display device capable of providing a voice recognition function.

BACKGROUND ART

Digital TV services using wired or wireless communication networks are becoming common. Digital TV services are capable of providing various services that could not be provided by the existing analog broadcasting services.

For example, Internet Protocol Television (IPTV) and smart TV services, which are types of digital TV services, provide interactivity so that users can actively select the types of watching programs, the watching time, and the like. IPTV and smart TV services may provide various additional services, such as Internet search, home shopping, and online games, based on such interactivity.

A recent display device such as a TV has a voice recognition service function that provides a function suitable for a voice in response to a voice uttered by a user.

However, in the related art, there is a limitation in providing only information or functions suitable for the voice uttered by the user, and there is an inconvenience in that the user has to provide a separate specific voice command in order to control the home appliance.

DISCLOSURE

Technical Problem

The present disclosure relates to a display device capable of identifying a home appliance associated with the intention of a voice command and providing a recommended operation of the identified home appliance.

The present disclosure relates to a display device capable of automatically controlling the operation of one or more home appliances associated with the intention of the voice command.

Technical Solution

A display device according to an embodiment of the present disclosure may include display unit; a wireless communication unit configured to wirelessly communicate with the home appliance; and a control unit configured to: receive a voice command, obtain the intention of the received voice command, identify one or more home appliances associated with the obtained intention, receive state information of the one or more home appliances from the identified one or more home appliances through the wireless communication unit, based on the received state information, obtain recommended operation information of the identified one or more home appliances, and display intention analysis information, the state information, and the recommended operation information, which are the analysis results of the intention, on the display unit.

A display device according to an embodiment of the present disclosure may include display unit; a network interface unit configured to communicate with the artificial intelligence server; a microphone configured to receive voice commands; and a control unit configured to: transmit the received voice command to the artificial intelligence server, receive, from the artificial intelligence server, intention analysis information that is a result of analyzing the intention of the voice command, state information of one or more home appliances associated with the intention, and recommended operation information of the one or more home appliances, and display the intention analysis information, the state information, and the recommended operation information on the display unit.

Advantageous Effect

According to various embodiments of the present disclosure, the user may receive a recommendation for an operation of a home appliance suitable for an environment in the house in addition to a desired intention through a voice command, and thus convenience may be improved.

In addition, since the user does not need an action for controlling the operation of a separate home appliance, an improved user experience can be provided.

DESCRIPTION OF DRAWINGS

FIGS. 13 to 16 are diagrams for explaining a process of providing recommended operation information of one or more home appliances associated with the intention of a voice command uttered by a user and controlling one or more home appliances according to an embodiment of the present disclosure.

BEST MODE

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present disclosure, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
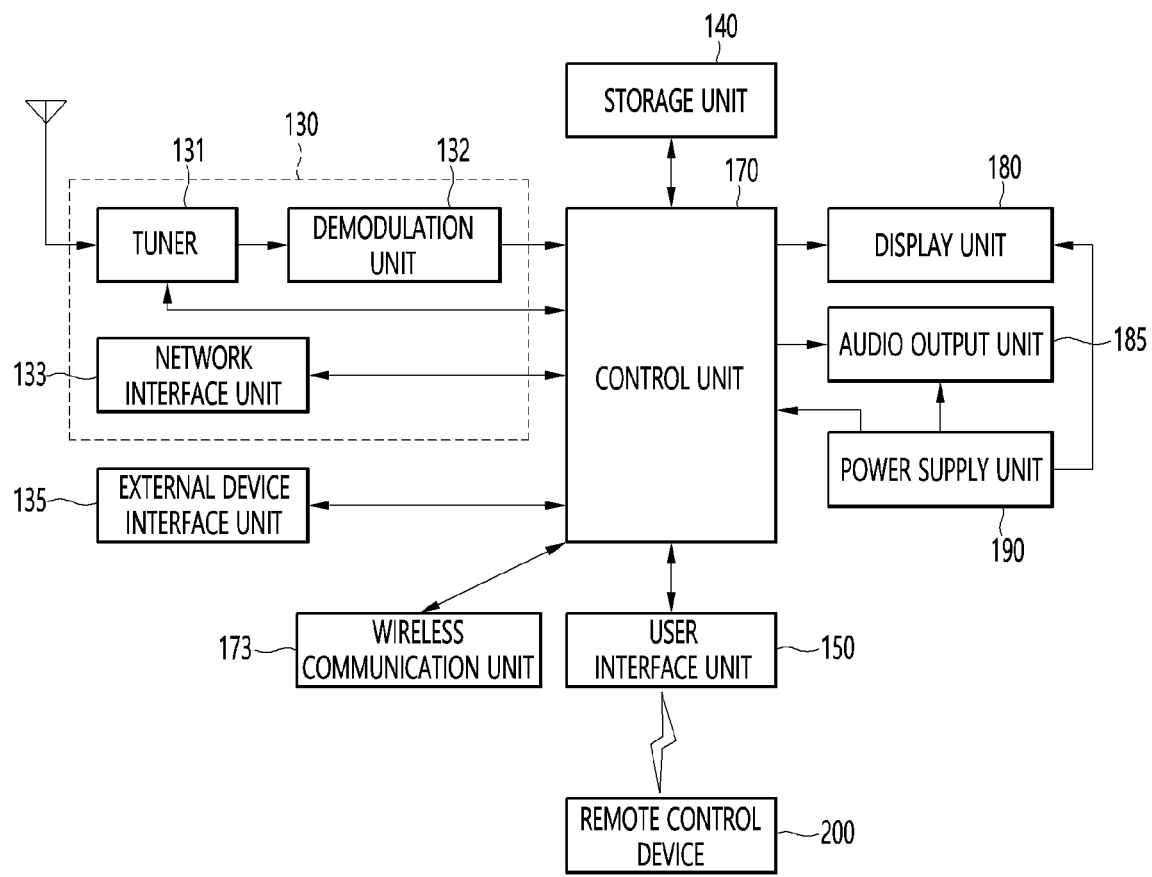
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception unit 130, an external device interface unit 135, a storage unit 140, a user interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program-related data signals, and can restore the divided video signals, audio signals, and data signals into the form capable of being output.

The external device interface unit 135 can receive an application or an application list in an adjacent external device, and can transmit the application or the application list to the control unit 170 or the storage unit 140.

The external device interface unit 135 can provide a connection path between the display device 100 and the external device. The external device interface unit 135 can receive at least one an image or audio output from the external device that is wirelessly or wiredly connected to the display device 100, and can transmit the image and/or the audio to the control unit 170. The external device interface unit 135 can include a plurality of external input terminals. The plurality of external input terminals can include an RGB terminal, at least one High Definition Multimedia Interface (HDMI) terminal, and a component terminal.

An image signal of the external device input through the external device interface unit 135 can be output through the display 180. A voice signal of the external device input through the external device interface unit 135 can be output through the audio output interface 185.

An external device connectable to the external device interface unit 135 can be one of a set-top box, a Blu-ray player, a DVD player, a game console, a sound bar, a smartphone, a PC, a USB memory, and a home theater system, but this is just exemplary.

The network interface unit 133 can provide an interface for connecting the display device 100 to a wired/wireless network including an Internet network. The network interface unit 133 can transmit or receive data to or from another user or another electronic device through an accessed network or another network linked to the accessed network.

In addition, some content data stored in the display device 100 can be transmitted to a user or an electronic device, which is selected from other users or other electronic devices preregistered in the display device 100.

The network interface unit 133 can access a predetermined webpage through an accessed network or another network linked to the accessed network. That is, the network interface unit 133 can transmit or receive data to or from a corresponding server by accessing a predetermined webpage through the network.

The network interface unit 133 can receive content or data provided from a content provider or a network operator. That is, the network interface unit 133 can receive content, such as movies, advertisements, games, VODs, and broadcast signals, which are provided from the content provider or the network operator, and information relating thereto through the network.

In addition, the network interface unit 133 can receive firmware update information and update files provided from the network operator, and can transmit data to the Internet or content provider or the network operator.

The network interface unit 133 can select and receive a desired application among applications open to the air, through the network.

The storage unit 140 can store signal-processed image, voice, or data signals stored by a program in order for each signal processing and control in the control unit 170.

In addition, the storage unit 140 can perform a function for temporarily storing image, voice, or data signals output from the external device interface unit 135 or the network interface unit 133, and can store information on a predetermined image through a channel memory function.

The storage unit 140 can store an application or an application list input from the external device interface unit 135 or the network interface unit 133.

The display device 100 can play content files (e.g., video files, still image files, music files, document files, application files, etc.) stored in the storage unit 140, and can provide the content files to a user.

The user input interface unit 150 can transmit signals input by a user to the control unit 170, or can transmit signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR communication methods.

In addition, the user input interface unit 150 can transmit, to the control unit 170, control signals input from local keys (not shown) such as a power key, a channel key, a volume key, and a setting key.

Image signals that are image-processed by the control unit 170 can be input to the display 180 and displayed as images corresponding to the image signals. In addition, image signals that are image-processed by the control unit 170 can be input to an external output device through the external device interface unit 135.

Voice signals processed by the control unit 170 can be output to the audio output interface 185. In addition, voice signals processed by the control unit 170 can be input to the external output device through the external device interface unit 135.

Additionally, the control unit 170 can control overall operations of the display device 100.

In addition, the control unit 170 can control the display device 100 by a user command or an internal program input through the user input interface unit 150, and can access the network to download a desired application or application list into the display device 100.

The control unit 170 can output channel information selected by a user together with the processed image or voice signals through the display 180 or the audio output interface 185.

In addition, the control unit 170 can output image signals or voice signals of an external device such as a camera or a camcorder, which are input through the external device interface unit 135, through the display 180 or the audio output interface 185, according to an external device image playback command received through the user input interface unit 150.

Moreover, the control unit 170 can control the display 180 to display images, and can control the display 180 to display broadcast images input through the tuner 131, external input images input through the external device interface unit 135, images input through the network interface, or images stored in the storage unit 140. In this case, an image displayed on the display 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

Moreover, the wireless communication unit 173 can perform wired or wireless communication with an external device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a wearable device capable of communication around the display device 100. Furthermore, if the detected wearable device is a device authenticated to communicate with the display device 100, the control unit 170 can transmit at least part of data processed in the display device 100 to the wearable device through the wireless communication unit 173. Therefore, a user of the wearable device can use the data processed by the display device 100 through the wearable device.

The display unit 180 can convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component, or one component can be divided into two or more components. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present disclosure described below can be performed by one of the display device described with reference to FIG. 1, an image processing device such as the separated set-top box, and a content playback device including the display unit 180 and the audio output unit 185.

A remote control device according to an embodiment of the present disclosure will be described with reference to FIGS. 2 and 3.

Figure 2:
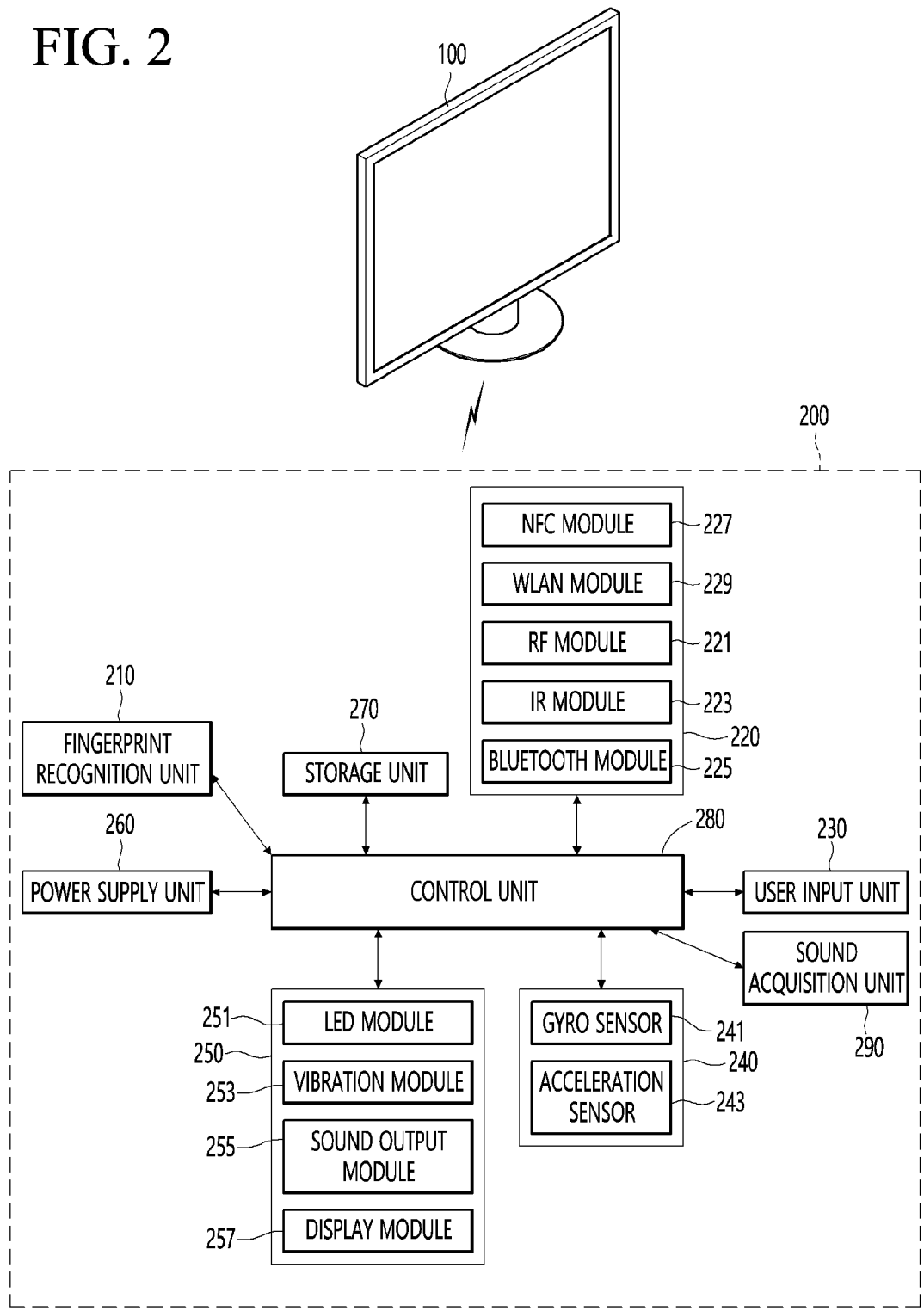
FIG. 2 is a block diagram illustrating a remote control device according to an embodiment of the present disclosure.
Figure 3:
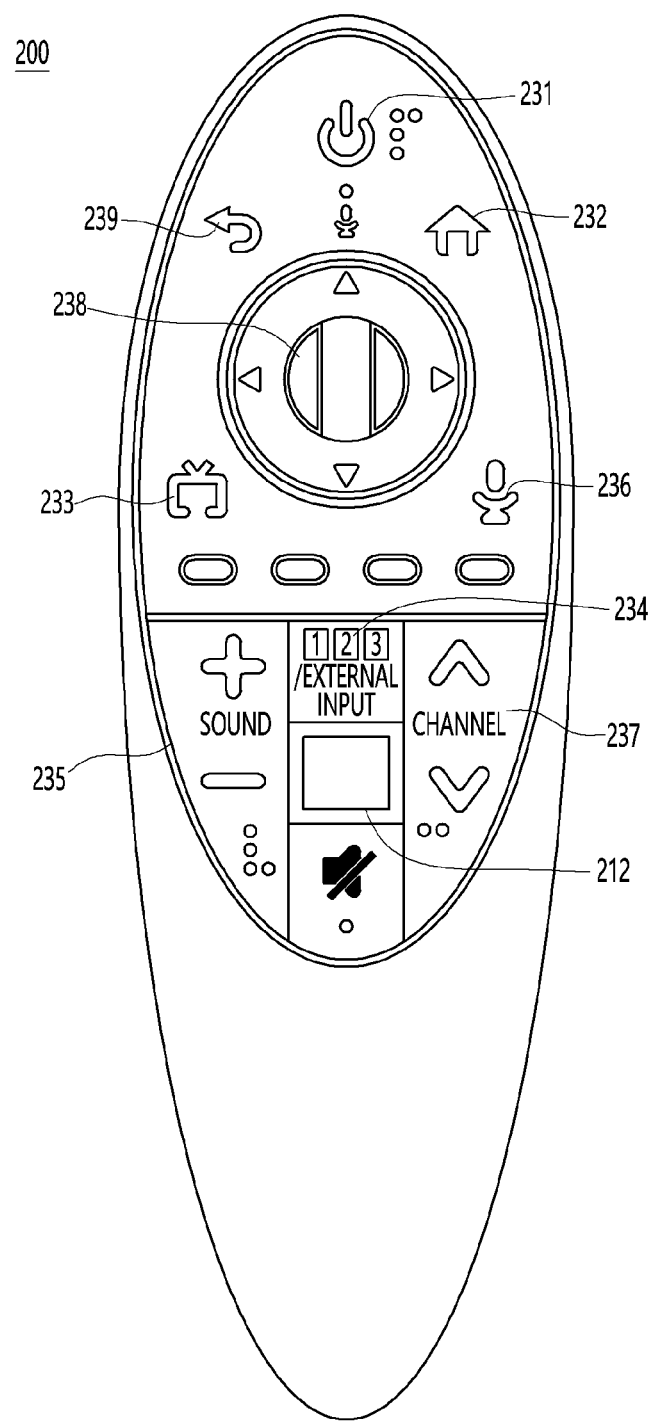
FIG. 3 is a view illustrating an actual configuration of a remote control device according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition unit 210, a wireless communication unit 220, a user input interface 230, a sensor unit 240, an output interface unit 250, a power supply unit 260, a storage 270, a control unit 280, and a voice acquisition unit 290.

Referring to FIG. 2, the wireless communication unit 220 transmits/receives signals to/from an arbitrary any one of display devices according to the above-mentioned embodiments of the present disclosure.

The remote control device 200 can include a radio frequency (RF) module 221 capable of transmitting or receiving signals to or from the display device 100 according to an RF communication standard, and an IR module 223 capable of transmitting or receiving signals to or from the display device 100 according to an IR communication standard. In addition, the remote control device 200 can include a Bluetooth module 225 capable of transmitting or receiving signals to or from the display device 100 according to a Bluetooth communication standard. In addition, the remote control device 200 can include an NFC module 227 capable of transmitting or receiving signals to or from the display device 100 according to an NFC communication standard, and a wireless LAN (WLAN) module 229 capable of transmitting or receiving signals to or from the display device 100 according to a WLAN communication standard.

In addition, the remote control device 200 can transmit signals containing information on the movement of the remote control device 200 to the display device 100 through the wireless communication unit 220.

Moreover, the remote control device 200 can receive signals transmitted from the display device 100 through the RF module 221 and if necessary, can transmit a command for power on/off, channel change, and volume change to the display device 100 through the IR module 223.

The user input interface 230 can be configured with a keypad, a button, a touch pad, or a touch screen. A user can operate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be a button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The volume control button 235 can be a button for controlling a volume output from the display device 100. The voice recognition button 236 can be a button for receiving user's voice and recognizing the received voice. The channel change button 237 can be a button for receiving broadcast signals of a specific broadcast channel. The OK button 238 can be a button for selecting a specific function, and the back button 239 can be a button for returning to a previous screen.

FIG. 2 is described again.

If the user input interface 230 includes a touch screen, a user can touch a soft key of the touch screen to input a command relating to the display device 100 to the remote control device 200. In addition, the user input interface 230 can include various kinds of input interfaces operable by a user, for example, a scroll key and a jog key, and this embodiment does not limit the scope of the present disclosure.

The sensor unit 240 can include a gyro sensor 241 or an acceleration sensor 243. The gyro sensor 241 can sense information on the movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor that senses a distance with respect to the display 180 of the display device 100.

The output interface unit 250 can output image or voice signals in response to the operation of the user input interface unit 253, or can output image or voice signals corresponding to signals transmitted from the display device 100. A user can recognize whether the user input interface unit 253 is operated or the display device 100 is controlled through the output interface unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the supply of power if a predetermined key provided at the remote control device 200 is operated.

The storage 270 can store various kinds of programs and application data required to control or operate the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to the control of the remote control device 200. The control unit 280 can transmit a signal corresponding to a predetermined key operation of the user input interface unit 253 or a signal corresponding to the movement of the remote control device 200 sensed by the sensor unit 240 to the display device 100 through the wireless communication unit 225.

In addition, the voice acquisition unit 290 of the remote control device 200 can acquire voice.

The voice acquisition unit 290 can include at least one microphone and acquire voice through the microphone.

Figure 4:
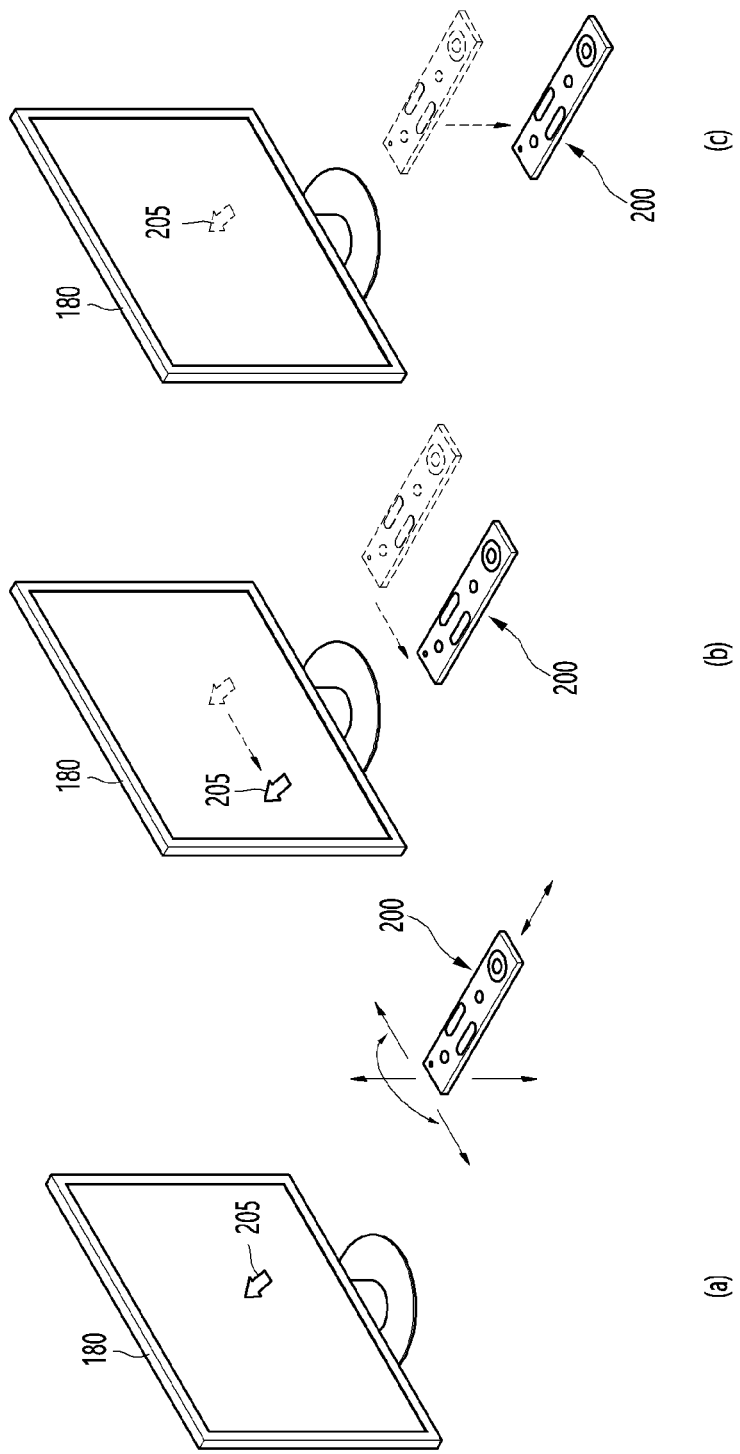
FIG. 4 is a view illustrating an example of utilizing a remote control device according to an embodiment of the present disclosure.

Next, FIG. 4 is described.

FIG. 4 is a view illustrating an example of utilizing a remote control device according to an embodiment of the present disclosure.

FIG. 4(a) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(b) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(c) illustrates that while a specific button in the remote control device 200 is pressed, a user moves the remote control device 200 away from the display unit 180. Thus, a selected region in the display 180 corresponding to the pointer 205 can be zoomed in and displayed in an enlarged size.

On the other hand, if a user moves the remote control device 200 close to the display unit 180, a selection area in the display unit 180 corresponding to the pointer 205 can be zoomed out and displayed in a reduced size.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded. That is, if the remote control device 200 is moved away from or closer to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200. Therefore, in addition to the arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
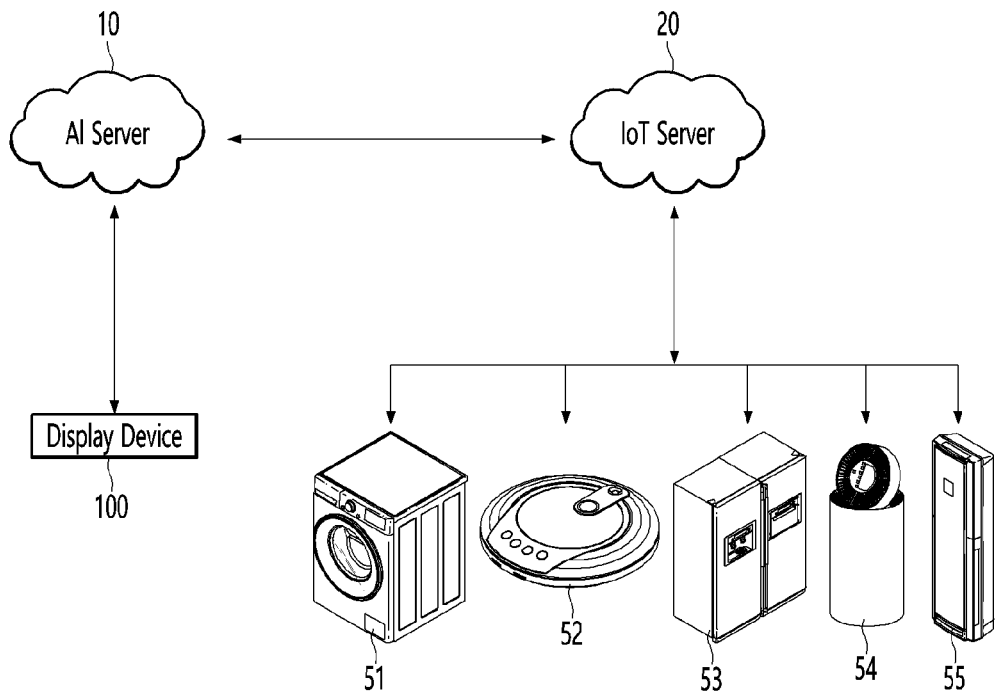
FIG. 5 is a view for describing an artificial intelligence (AI) system according to an embodiment of the present disclosure.

FIG. 5 is a view for describing an artificial intelligence (AI) system according to an embodiment of the present disclosure.

An AI system 5 can include a display device 100, an AI server 10, an IoT server 20, and a plurality of home appliances 51 to 55.

The display device 100 can wirelessly communicate with the AI server 10.

The display device 100 may transmit voice data corresponding to the voice command uttered by the user to the AI server 10.

The AI server 10 may obtain the intention of the voice command based on the voice data received from the display device 100.

The AI server 10 may identify one or more home appliances associated with the obtained intention.

The AI server 10 may request state information of one or more home appliances identified through the AI server to the IoT server 20.

State information of one or more home appliances may be received from the IoT server 20 through the AI server.

The AI server 10 may obtain recommended operation information of one or more home appliances based on the obtained intention of the voice command and the received state information of one or more home appliances.

The AI server 10 may transmit, to the display device 100, intention analysis information of a voice command, state information of one or more home appliances, and recommended operation information of one or more home appliances.

The display device 100 may output the received intention analysis information, state information of one or more home appliances, and recommended operation information of one or more home appliances.

The display device 100 may transmit a request for a recommended operation to the AI server 10.

The AI server 10 may transmit a control command to the IoT server 20 to perform an operation corresponding to the recommended operation information.

The IoT server 20 may transmit a control command to the corresponding home appliance.

The IoT server 20 may periodically transmit identification information and state information of one or more home appliances to the AI server 10. The home appliance may be any one of a washing machine 51, a robot cleaner 52, a refrigerator 53, an air purifier 54, and an air conditioner 55.

Figure 6:
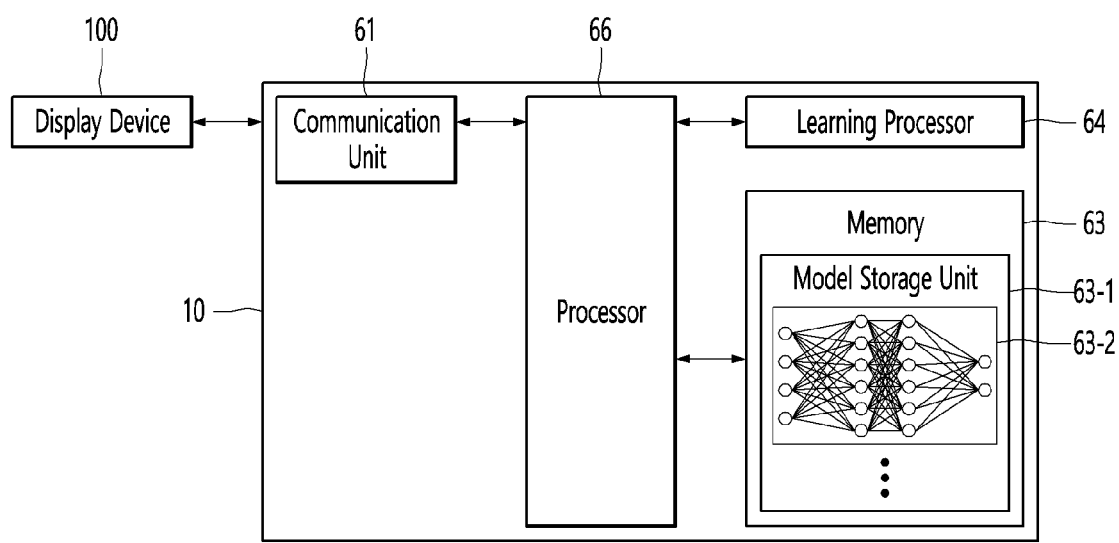
FIG. 6 is a block diagram for describing the configuration of the AI server according to an embodiment of the present disclosure.

FIG. 6 is a block diagram for describing the configuration of the AI server according to an embodiment of the present disclosure.

Referring to FIG. 6, the AI server 10 can refer to a device that learns an artificial neural network by using a machine learning algorithm or uses a learned artificial neural network. The AI server 10 can be configured with a plurality of servers to perform distributed processing, and can be defined as a 5G network. In this case, the AI server 10 can be included as a part of the display device 100 to perform at least a part of AI processing together.

The AI server 10 can include a communication unit 61, a memory 63, a learning processor 64, and a processor 66.

The communication unit 61 may transmit or receive data to or from an external device such as the display device 100.

The memory 63 can include a model storage unit 63-1. The model storage unit 63-1 may store a model (or an artificial neural network 63-2) that is being learned or is learned through the learning processor 64.

The learning processor 64 can learn the artificial neural network 63-2 by using training data. The learning model can be used while being mounted on the AI server 10 of the artificial neural network, or can be used while being mounted on the external device such as the display device 100.

The learning model can be implemented as hardware, software, or a combination of hardware and software. When all or part of the learning model is implemented as software, one or more instructions constituting the learning model can be stored in the memory 63.

The processor 660 can infer a result value for new input data by using the learning model and generate a response or a control command based on the inferred result value.

Figure 7:
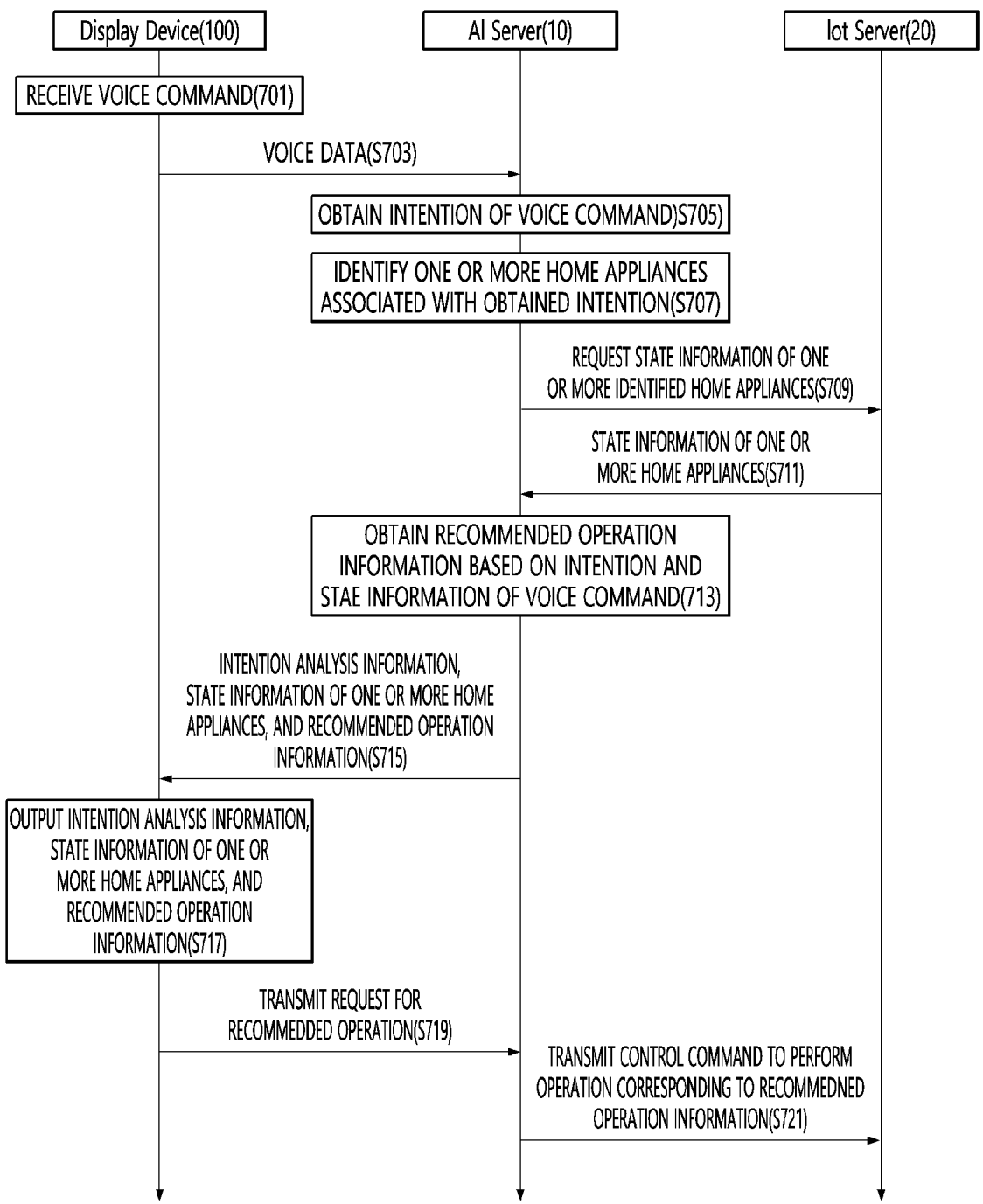
FIG. 7 is a ladder diagram for an operating method of an AI system according to an embodiment of the present disclosure.

FIG. 7 is a ladder diagram for an operating method of an AI system according to an embodiment of the present disclosure.

The control unit 170 of the display device 100 receives a voice command uttered by the user (S701).

In an embodiment, the control unit 170 may receive a voice command through a microphone provided in the user input interface unit 150.

In another embodiment, the control unit 170 may receive a voice command received by the remote control device 200.

The control unit 170 may convert a voice signal corresponding to a voice command into voice data.

The control unit 170 of the display device 100 transmits voice data corresponding to the received voice command to the AI server 10 through the network interface unit 133 (S703).

The processor 66 of the AI server 10 obtains the intention of the voice command based on the voice data received from the display device 100 (S705).

The processor 66 may convert voice data into text data using a speech-to-text (STT) engine.

The processor 66 may analyze the intention of the converted text data using a natural language processing (NLP) engine and may obtain the intention of the voice command according to the intention analysis result.

The processor 66 of the AI server 10 identifies one or more home appliances associated with the obtained intention (S707).

The processor 66 may identify one or more home appliances associated with the obtained intention among a plurality of home appliances 51 to 55 provided in the house.

The AI server 10 may receive information about a plurality of home appliances 51 to 55 provided in the house from the IoT server 20 and store the information in the memory 63.

The information of each home appliance may include at least one of a name of the home appliance, a model name of the home appliance, and a general function and a special function of the home appliance.

The processor 66 may identify the home appliance matching the obtained intention.

For example, when the obtained intention is to request the weather, the processor 66 may identify one or more home appliances capable of providing information about the weather among the plurality of home appliances 51 to 55.

Specifically, when the obtained intention is to request the weather, the processor 66 may obtain the air purifier 54 capable of providing a state of fine dust in the house as a device associated with the intention.

As another example, when the obtained intention is to request cleaning, the processor 66 obtains the robot cleaner 52 capable of performing cleaning among the plurality of home appliances 51 to 55 as a device associated with the intention.

The processor 66 of the AI server 10 requests the IoT server 20 for state information of one or more home appliances identified through the communication unit 61 (S709).

In an embodiment, the state information of the home appliance may include one or more of operation information of the home appliance and measurement information measured by the home appliance.

The operation information of the home appliance may include one or more of whether the home appliance is turned on/off, an operating time of the home appliance, a current operation mode of the home appliance, and operation modes supported by the home appliance.

The measurement information of the home appliance may be sensing information measured through a sensor provided in the home appliance. For example, the air purifier 54 may include a dust sensor and measure the concentration of fine dust in the house.

The air conditioner 55 may include a temperature sensor and a humidity sensor and may measure the temperature in the house through the temperature sensor and the humidity in the house through the humidity sensor.

The processor 66 of the AI server 10 receives state information of one or more home appliances from the IoT server 20 through the communication unit 61 (S711).

The processor 66 of the AI server 10 obtains the recommended operation information of one or more home appliances based on the obtained intention of the voice command and the received state information of one or more home appliances (S713).

The recommended operation information of the home appliance may be information for recommending the operation of the home appliance.

The processor 66 may generate recommended operation information for recommending the operation of one or more identified home appliances according to the intention of the voice command.

When it is determined that a change in the environment in the house is necessary based on the state information, the processor 66 may generate recommended operation information for recommending the operation of one or more home appliances for the change of the environment. The environmental change may be any one or more of a change in air quality states, a change in temperature, and a change in humidity in the house.

The processor 66 of the AI server 10 transmits, to the display device 100 through the communication unit 61, intention analysis information of a voice command, state information of one or more home appliances, and recommended operation information of one or more home appliances (S715).

The control unit 170 of the display device 100 outputs the received intention analysis information, state information of one or more home appliances, and recommended operation information of one or more home appliances (S717).

The control unit 170 may output the intention analysis information, the state information, and the recommended operation information as audio through the audio output unit 185.

As another example, the control unit 170 may display intention analysis information, state information, and recommended operation information through the display unit 180.

As the recommended operation information is output, the user may receive a guide for controlling the operation of the home appliance by reflecting not only external information but also state information of the home appliance. Accordingly, simultaneous control of home appliances optimized for individuals may be performed, thereby providing an improved user experience.

The control unit 170 of the display device 100 transmits a request for a recommended operation to the AI server 10 through the network interface unit 133 (S719).

The control unit 170 may receive a request for a recommended operation from the remote control device 200.

The control unit 170 may receive a request command for the operation of the usage recommendation through the microphone provided in the user input interface unit 150.

The processor 66 of the AI server 10 transmits a control command to the IoT server 20 to perform an operation corresponding to the recommended operation information through the communication unit 61 (S721).

The control command may include commands for controlling each of two or more home appliances. For example, the control command may include a first command for controlling the operation of the first home appliance and a second command for controlling the operation of the second home appliance.

The IoT server 20 may transmit an operation command for controlling the operation of the corresponding home appliance to the corresponding home appliance according to the received control command. The corresponding home appliance may perform a specific function according to an operation command received from the IoT server 20.

According to an embodiment of the present disclosure, the user can conveniently control the operation of the home appliance without a manipulation for separately controlling the operation of the home appliance.

Meanwhile, the AI server 10 may automatically transmit a control command for performing an operation corresponding to the usage recommended information to the lot server 20 without a request for the operation of the usage recommendation.

In other words, steps S719 to S721 of FIG. 7 may be omitted.

Accordingly, the user can feel the effect of being automatically capable of controlling the home appliance without a request for the operation of the usage recommendation.

FIGS. 8 to 11 are diagrams for explaining a process of identifying one or more home appliances matching the intention of a voice command, and controlling the operation of the identified home appliance according to an embodiment of the present disclosure.

Figure 8:
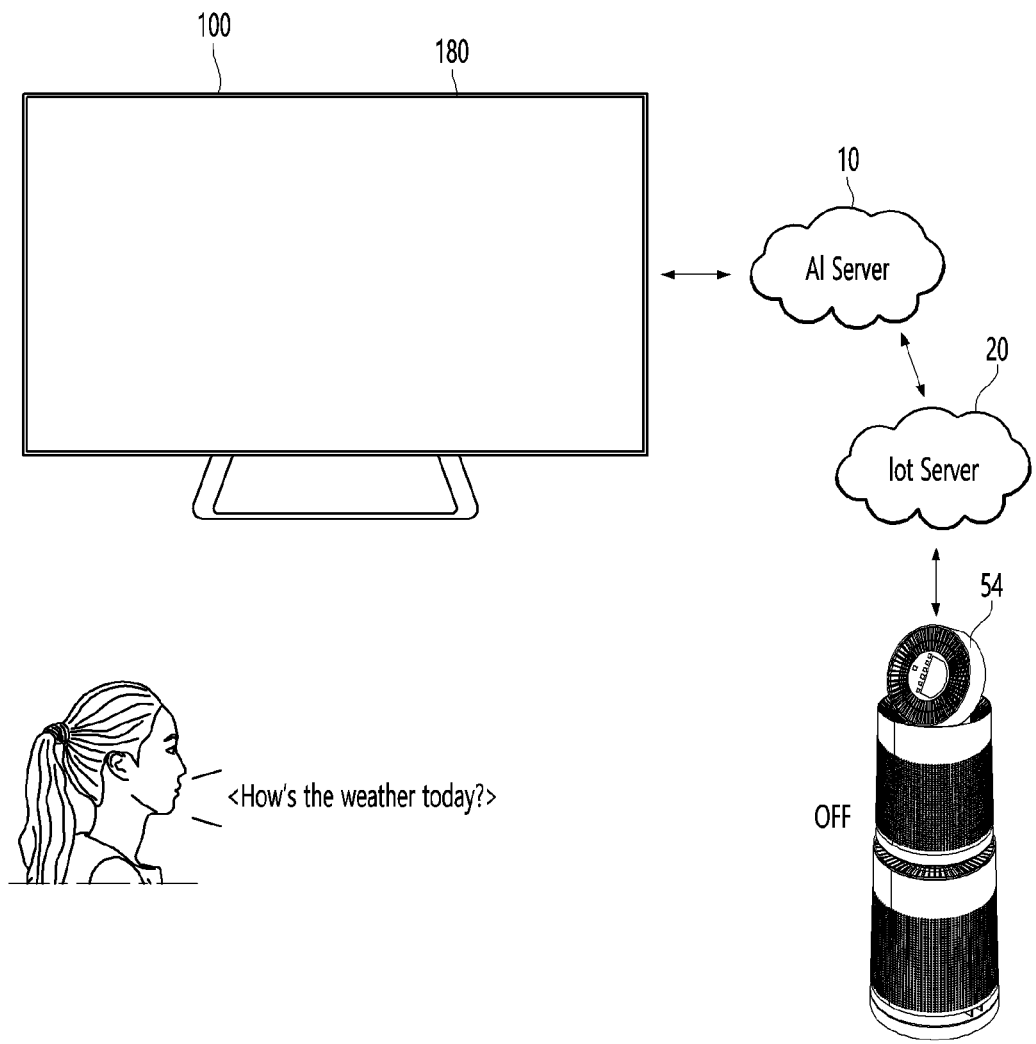
FIGS. 8 to 11 are diagrams for explaining a process of identifying one or more home appliances matching the intention of a voice command, and controlling the operation of the identified home appliance according to an embodiment of the present disclosure.
Figure 9:
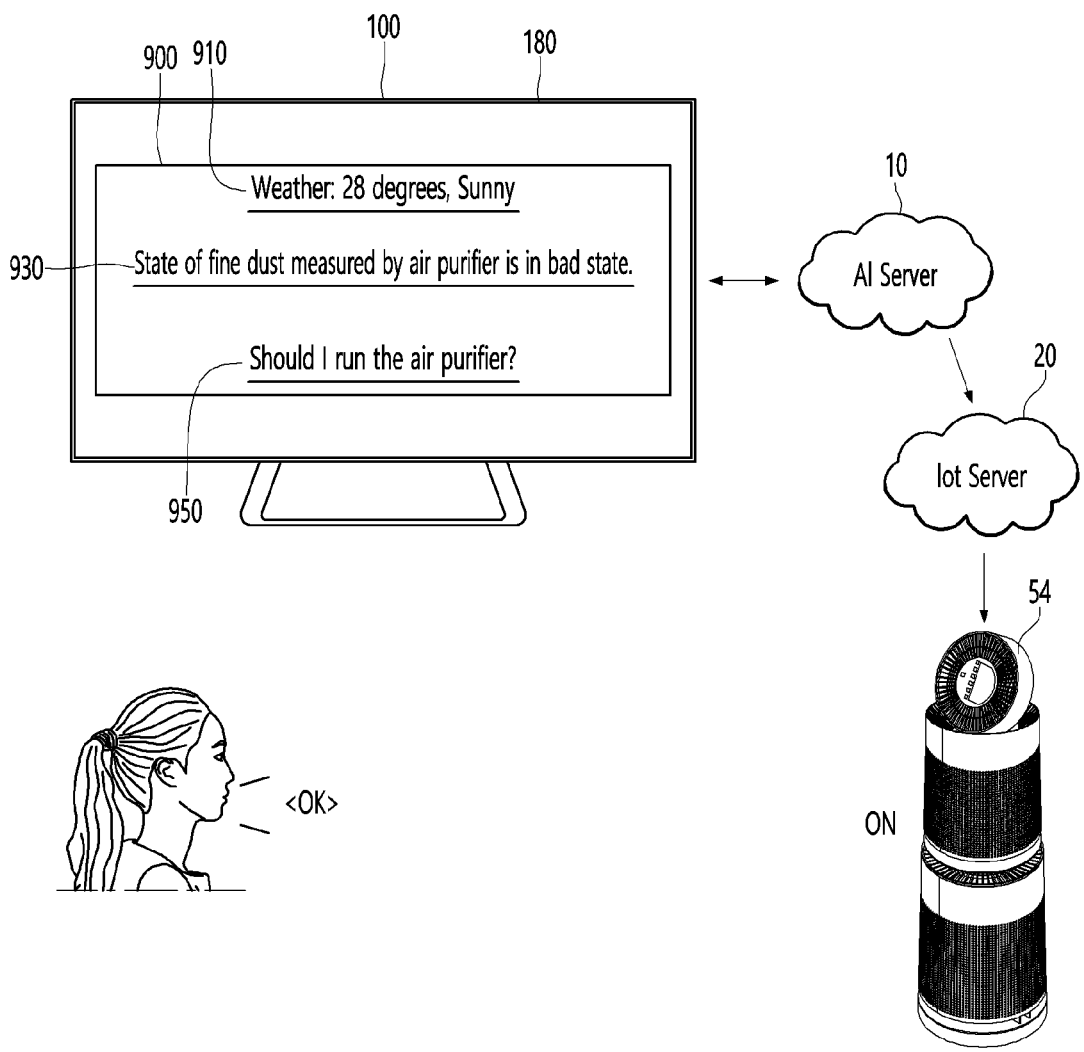
Figure 10:
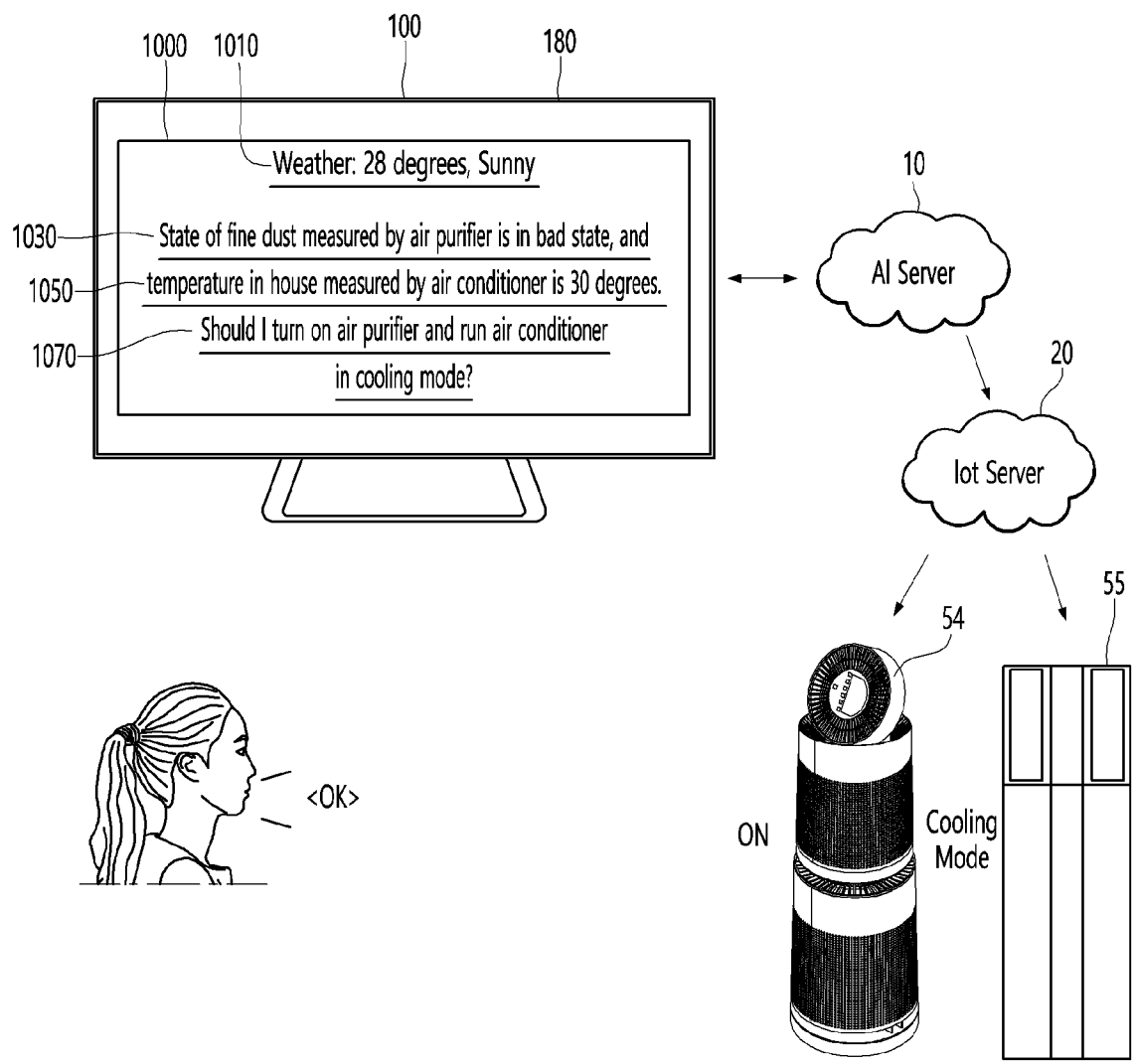
Figure 11:
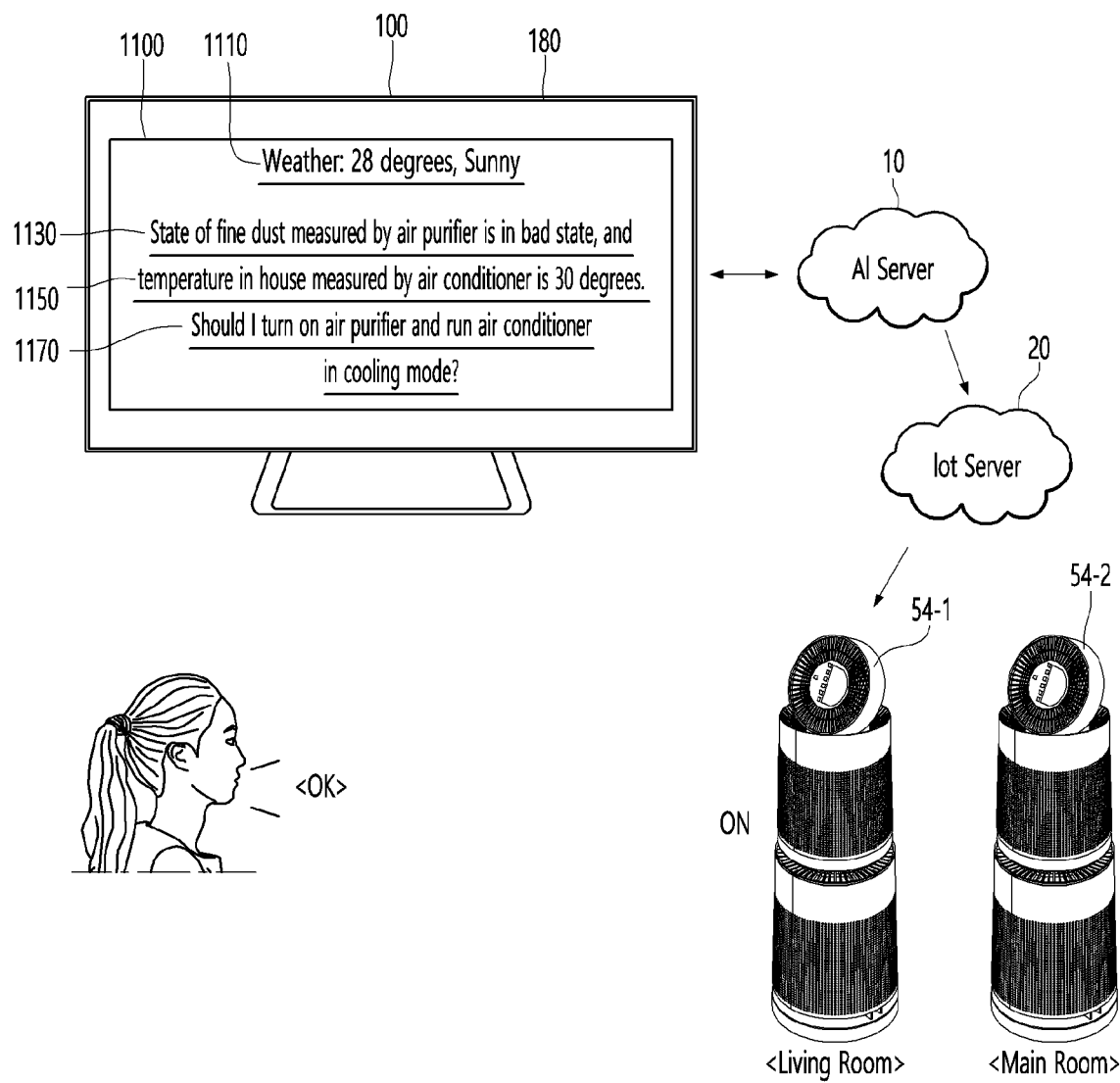

In particular, FIGS. 8 and 9 are embodiments in which one home appliance matching the intention of a voice command is identified, and FIGS. 10 and 11 are views explaining an embodiment in which a plurality of home appliances matching the intention of a voice command are identified.

First, FIGS. 8 and 9 will be described.

Users can utter the voice command <How's the weather today?>.

The display device 100 may receive a voice command uttered by a user, pre-process the received voice command, and transmit the pre-processed voice data to the AI server 10.

The AI server 10 may convert the received voice data into text data and determine the intention of the converted text data.

The AI server 10 may receive external weather information from a weather server (not illustrated) according to the identified intention.

In addition, the AI server 10 may identify a weather-related home appliance among a plurality of home appliances 51 to 55 provided in the house. Specifically, the AI server 10 may extract a keyword representing the weather. The keyword representing the weather may include temperature, humidity, air state, and air quality state.

The AI server 10 may determine a home appliance capable of providing information on one or more of temperature, humidity, air state, and air quality state indicating weather among the plurality of home appliances 51 to 55.

As another example, the AI server 10 may determine a home appliance capable of controlling one or more of temperature, humidity, air state, and air quality state indicating weather among a plurality of home appliances 51 to 55.

As another example, while providing information about one or more of temperature, humidity, air state, and air quality state indicating the weather among the plurality of home appliances 51 to 55, home appliances capable of controlling one or more of temperature, humidity, air state, and air quality state indicating the weather can be determined.

For example, the AI server 10 may identify the air purifier 54 that can control the air quality state.

The AI server 10 may receive the indoor air quality state from the air purifier 54.

The air quality state may include a good state, a normal state, and a bad state classified according to the indoor fine dust concentration measured by the air purifier 54.

The AI server 10 may receive the current operating state and air quality state from the air purifier 54.

The AI server 10 may generate intention analysis information according to the intention of the voice command, the air quality state received from the air purifier 54, and recommended operation information of the air purifier 54 and transmit it to the display device 100.

Referring to FIG. 9, the display device 100 may display information 900 received from the AI server 10 in text form through the display unit 180.

The information 900 may include intention analysis information 910 according to intention analysis of a voice command called <how's the weather today?>, air quality state information 930 measured by the air purifier 54 related to the intention, and the recommended operation information 950 that recommends turning on the operation of the air purifier 54.

When the user utters the voice command <Ok>, the display device 100 may determine that the user agrees to the recommended operation information 950.

The display device 100 may transmit the user's consent determination to the AI server 10.

The AI server 10 may transmit a control command to turn on the operation of the air purifier 54 to the IoT server 20 according to the user's consent determination. The IoT server 20 may transmit an operation command for turning on the operation of the air purifier 54 to the air purifier 54 according to the received control command.

The air purifier 54 may turn on the operation thereof according to the operation command received from the IoT server 20.

As such, according to an embodiment of the present disclosure, as the home appliance matching the intention of the voice command is automatically controlled, the user may receive an improved user experience.

Referring to FIG. 10, the AI server 10 may identify two home appliances that match the intention of the voice command uttered by the user, <How's the weather today?>.

The AI server 10 may identify the air purifier 54 associated with the air quality state and the air conditioner 55 associated with temperature/humidity among a plurality of home appliances.

In other words, the AI server 10 may determine the air purifier 54 and the air conditioner 55 as the home appliance associated with the weather among the plurality of home appliances.

The display device 100 may display the information 1000 received from the AI server 10 through the display unit 180.

The information 1000 may include weather information 1010 received from an external server, air quality state information 1030 measured by the air purifier 54, indoor temperature information 1050 measured by the air conditioner 55, and the recommended operation information 1070 for guiding the operation of the air purifier 54 and the air conditioner 55.

In a case where the user utters the voice command <Ok>, the display device 100 may determine that the user agrees to the recommended operation information 1070.

The display device 100 may transmit the user's consent determination to the AI server 10.

The AI server 10 may transmit a control command to turn on the operation of the air purifier 54 and to set the operation mode of the air conditioner 55 to the cooling mode to the IoT server 20 according to the user's consent determination. The IoT server 20 may transmit an operation command to turn on the operation of the air purifier 54 to the air purifier 54 according to the received control command and may transmit an operation command to set the operation mode of the air conditioner 55 to the cooling mode to the air conditioner 55.

The air purifier 54 may turn on the ventilation mode according to the operation command received from the IoT server 20.

The air conditioner 55 may switch the operation mode thereof to the cooling mode according to the operation command received from the IoT server 20.

As such, according to an embodiment of the present disclosure, as a plurality of home appliances matching the intention of the voice command are automatically controlled, the user may receive an improved user experience.

FIG. 11 is a view for explaining a case where the first air purifier 54-1 and the second air purifier 54-2 are disposed in the living room and the main room, respectively.

Referring to FIG. 11, the AI server 10 may identify two air purifiers that match the intention of a voice command uttered by the user, <How's the weather today?>.

In other words, the AI server 10 may identify the first air purifier 54-1 and the second air purifier 54-2 associated with an air quality state that matches the intention of the voice command.

The display device 100 may display the information 1100 received from the AI server 10 through the display unit 180.

The information 1100 may include weather information 1110 received from an external server, air quality state information 1130 in the living room measured by the first air purifier 54-1, the air quality state information 1150 in the main room measured by the second air purifier 54-2, and the recommended operation information 1170 for recommending the operation of the first air purifier 54-1.

The AI server 10 may generate the recommended operation information 1170 based on the air quality state information 1130 measured by the first air purifier 54-1 placed in the living room and air quality state information measured by the second air purifier 54-2 placed in the main room.

The AI server 10 may determine the ventilation of the living room because the air quality state of the living room is in a bad state and the air quality state of the main room is in a good state. To this end, the AI server 10 may generate the recommended operation information 1170 for turning on the operation of the first air purifier 54-1 in order to change the air quality state of the living room.

When the user utters the voice command <Ok>, the display device 100 may determine that the user agrees to the recommended operation information 1170.

The display device 100 may transmit the user's consent determination to the AI server 10.

The AI server 10 may transmit a control command for turning on the operation of the first air purifier 54-1 to the IoT server 20 according to the user's consent determination. The IoT server 20 may transmit an operation command for turning on the operation of the first air purifier 54-1 to the first air purifier 54-1 according to the control command received from the AI server 10.

The first air purifier 54-1 may turn on the ventilation mode according to the operation command received from the IoT server 20.

Figure 12:
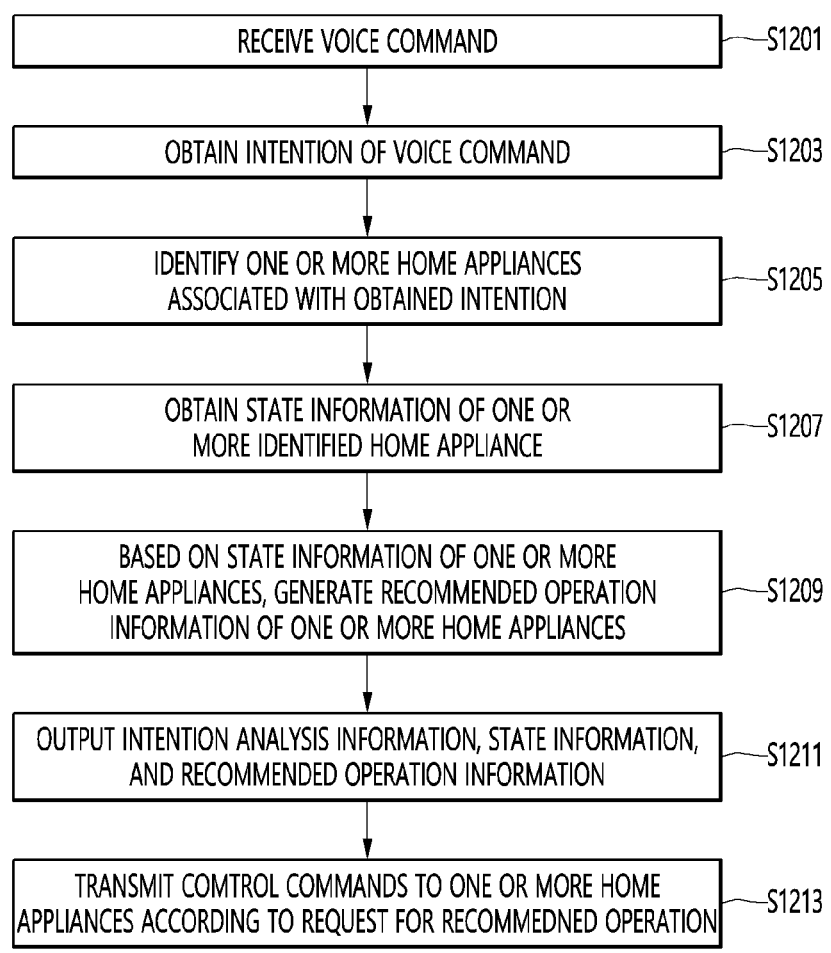
FIG. 12 is a flowchart illustrating a method for operating a display device according to an embodiment of the present disclosure.

FIG. 12 is a flowchart illustrating a method for operating a display device according to an embodiment of the present disclosure.

In particular, the display device 100 is a diagram for explaining a process of directly identifying a home appliance that matches the intention of the voice command and providing recommended operation information of the identified home appliance.

Referring to FIG. 12, the control unit 170 of the display device 100 receives a voice command uttered by a user (S1201).

In an embodiment, the control unit 170 may receive a voice command through a microphone provided in the user input interface unit 150.

In another embodiment, the control unit 170 may receive a voice command received by the remote control device 200.

The control unit 170 may convert a voice signal corresponding to a voice command into voice data.

The control unit 170 obtains the intention of the received voice command (S1203) and identifies one or more home appliances associated with the obtained intention (S1205).

The control unit 170 may convert voice data into text data using a speech-to-text (STT) engine.

The control unit 170 may analyze the intention of the converted text data using a natural language processing (NLP) engine and obtain the intention of the voice command according to the intention analysis result.

In another embodiment, the control unit 170 may transmit the voice data to the AI server 10 and obtain the intention of the voice data from the AI server 10.

The control unit 170 may identify one or more home appliances associated with the obtained intention among a plurality of home appliances 51 to 55 provided in the house.

The control unit 170 may receive, from the IoT server 20, information on a plurality of home appliances 51 to 55 provided in the house and store the information in the memory 63.

The information of each home appliance may include at least one of a name of the home appliance, a model name of the home appliance, and a general function and a special function of the home appliance.

The control unit 170 may identify the home appliance matching the obtained intention.

For example, when the obtained intention is to request the weather, the control unit 170 may identify one or more home appliances capable of providing information about the weather among the plurality of home appliances 51 to 55.

Specifically, when the obtained intention is to request the weather, the control unit 170 may obtain the air purifier 54 capable of providing a state of fine dust in the house as a device associated with the intention.

As another example, when the obtained intention is to request cleaning, the control unit 170 may obtain the robot cleaner 52 capable of performing cleaning among the plurality of home appliances 51 to 55 as a device associated with the intention.

The control unit 170 obtains state information of one or more identified home appliances (S1207).

In an embodiment, the state information of the home appliance may include one or more of operation information of the home appliance and measurement information measured by the home appliance.

The operation information of the home appliance may include one or more of whether the home appliance is turned on/off, an operating time of the home appliance, a current operation mode of the home appliance, and operation modes supported by the home appliance.

The measurement information of the home appliance may be sensing information measured through a sensor provided in the home appliance. For example, the air purifier 54 may include a dust sensor and measure the concentration of fine dust in the house.

The air conditioner 55 may include a temperature sensor and a humidity sensor and may measure the temperature in the house through the temperature sensor and the humidity in the house through the humidity sensor.

The control unit 170 may request state information from one or more home appliances identified through the wireless communication unit 173 and receive state information from the one or more home appliances.

The control unit 170 generates recommended operation information of one or more home appliances based on the identified state information of one or more home appliances (S1209).

The recommended operation information of the home appliance may be information for recommending the operation of the home appliance.

When it is determined that a change in the environment in the house is necessary based on the state information, the control unit 170 may generate recommended operation information for recommending the operation of one or more home appliances to change the environment. The environmental change may be any one or more of a change in air quality, a change in temperature, and a change in humidity in the house.

The control unit 170 outputs intention analysis information according to the analysis of the intention, state information of one or more home appliances, and recommended operation information of one or more home appliances (S1211).

The control unit 170 may output the intention analysis information, the state information of one or more home appliances, and the recommended operation information of the one or more home appliances through the display unit 180 or the audio output unit 185.

The control unit 170 receives a request for a recommended operation of one or more home appliances and transmits a control command for performing a recommended operation to one or more home appliances according to the received request (S1213).

The request for the recommended operation may be a voice command in which the user approves the recommended operation.

The control command may include commands for controlling each of two or more home appliances. For example, the control command may include a first command for controlling the operation of the first home appliance and a second command for controlling the operation of the second home appliance.

One or more home appliances receiving the control command may perform an operation according to the control command.

FIGS. 13 to 16 are diagrams for explaining a process of providing recommended operation information of one or more home appliances associated with the intention of a voice command uttered by a user and controlling one or more home appliances according to an embodiment of the present disclosure.

First, referring to FIG. 13, a user may utter a voice command <How's the weather today?>.

The display device 100 may obtain the intention of the voice command and identify one or more home appliances associated with the obtained intention.

The intention of the voice command may be to provide weather information.

The display device 100 may identify a home appliance capable of providing information on temperature, humidity, air state, and air quality state indicating weather among a plurality of home appliances provided in the house.

As another example, the display device 100 may identify a home appliance capable of controlling a temperature, humidity, air state, and air quality state indicating weather among a plurality of home appliances provided in the house.

Figure 14:
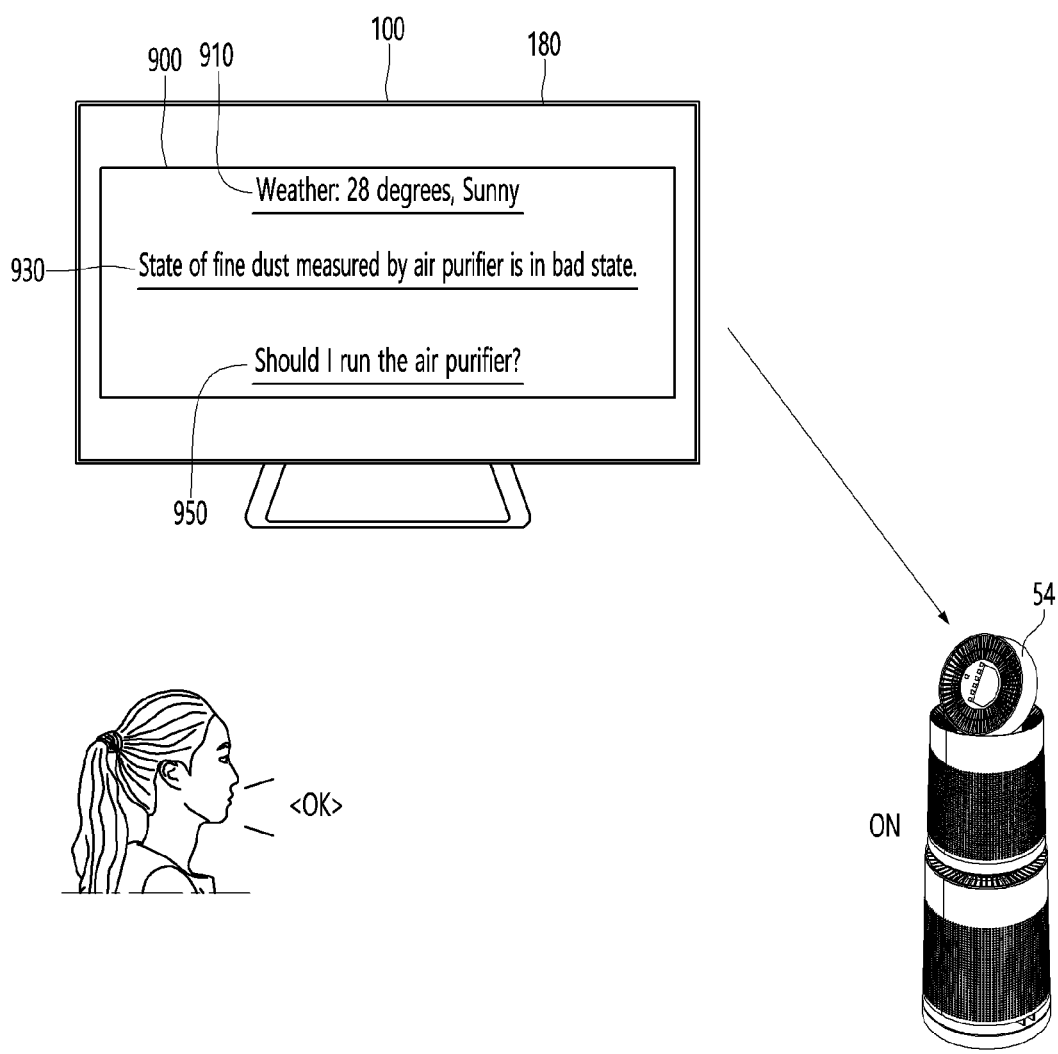

In FIG. 14, it is assumed that the air purifier 54 has been identified.

The display device 100 may receive the indoor air quality state measured by the air purifier 54 from the air purifier 54.

The display device 100 may generate recommended operation information for recommending the operation of the air purifier 54 based on the indoor air quality state.

Meanwhile, the display device 100 may receive weather information, which is intention analysis information according to intention analysis of a voice command, from an external server.

As illustrated in FIG. 14, the display device 100 may display the information 900 including weather information 910, indoor air quality state information 930 measured by the air purifier 54, and the recommended operation information 950 of the air purifier 54 on the display unit 180.

The display device 100 may receive a voice command <ok> that approves the recommended operation of the air purifier 54 uttered by the user.

The display device 100 may transmit a control command for turning on the operation of the air purifier 54 to the air purifier 54 through the wireless communication unit 173 according to the received voice command.

As described above, according to an embodiment of the present disclosure, the user may receive analysis information according to the intention of the voice command uttered by the user and, at the same time, control the operation of the home appliance associated with the intention.

Next, FIG. 15 will be described.

Figure 15:
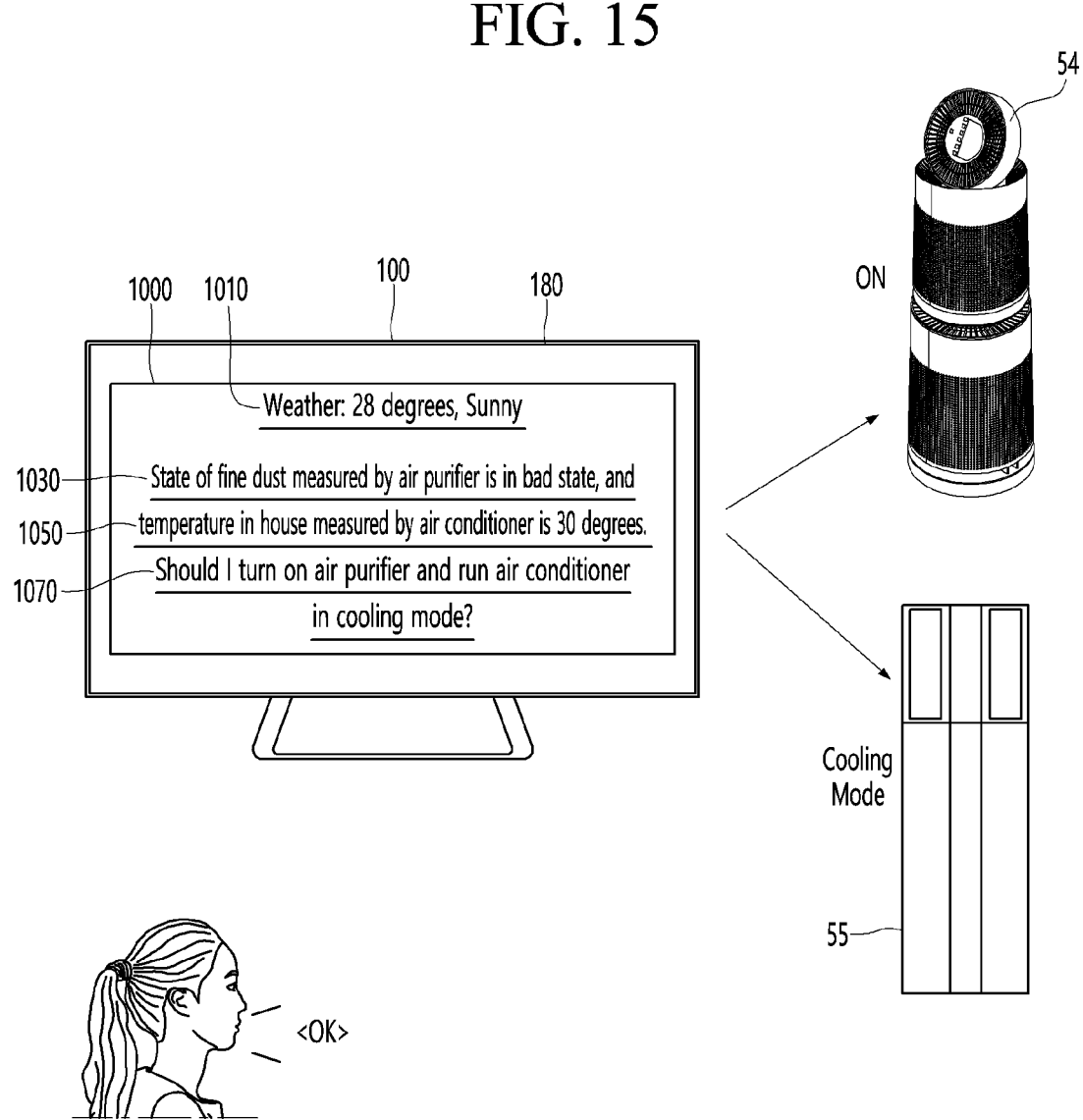

In FIG. 15, it is assumed that two home appliances associated with the intention of the user's voice command are identified. The two home appliances are an air purifier 54 and an air conditioner 55.

The display device 100 may receive indoor air quality state information from the air purifier 54 and receive indoor temperature and indoor humidity from the air conditioner 55.

The display device 100 may generate recommended operation information for guiding the operation of the air purifier 54 to be turned on when the air quality state is in a bad state, based on the indoor air quality state information.

In addition, when the indoor temperature is higher than the outdoor temperature, the display device 100 may generate recommended operation information for guiding the operation mode of the air conditioner 55 to be operated in the cooling mode.

The display device 100 may display the information 1000 including the weather information 1010 received from the external server, the air quality state information 1030 measured by the air purifier 54, the indoor temperature information 1050 measured by the air conditioner 55, and the recommended operation information 1070 for guiding the operation of the air purifier 54 and the air conditioner 55 on the display unit 180.

As such, according to an embodiment of the present disclosure, a plurality of home appliances associated with the intention of the voice command may be identified, and operation control of the identified plurality of home appliances may be performed.

Next, FIG. 16 will be described.

Figure 16:
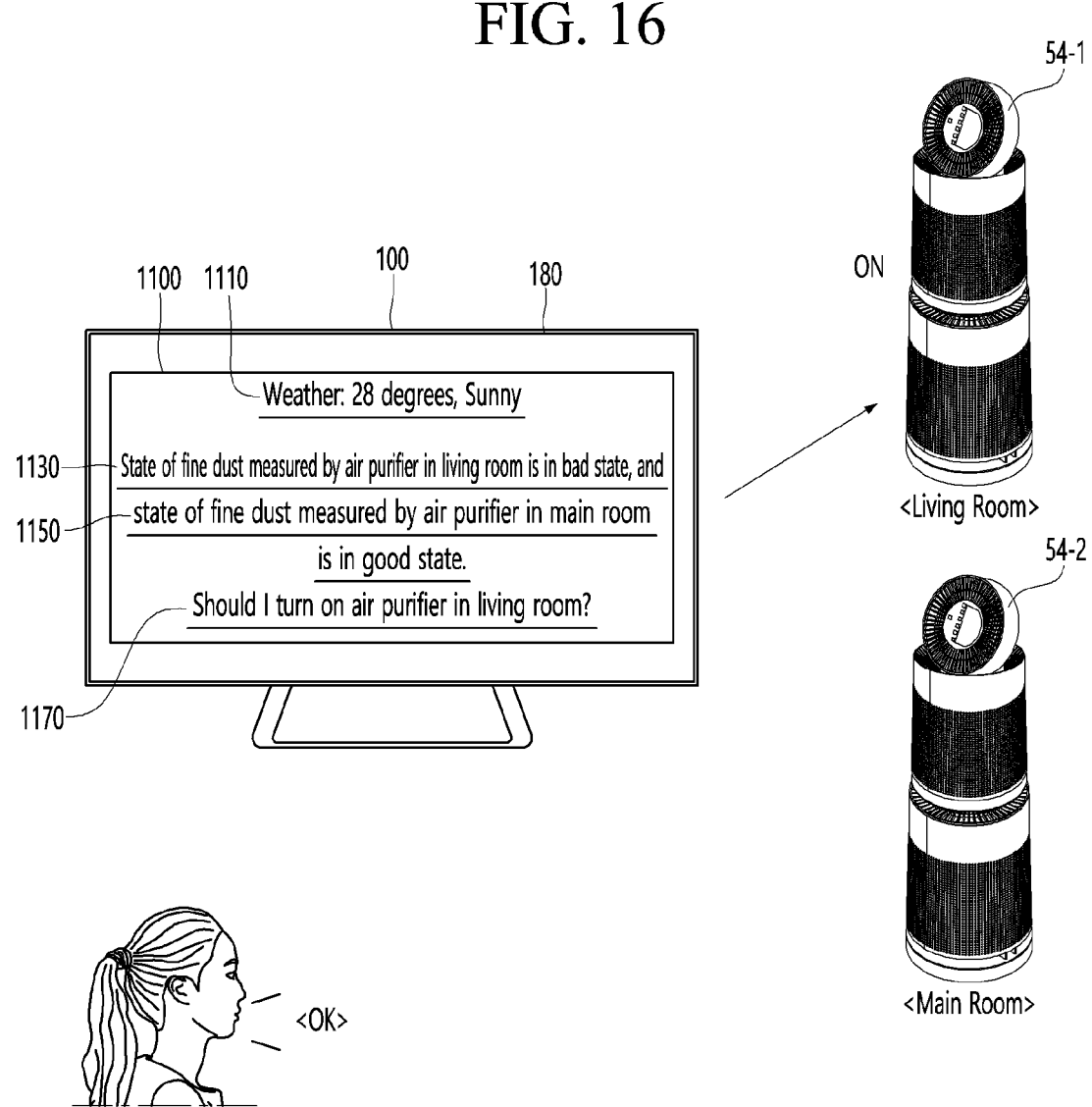

In FIG. 16, it is assumed that two air purifiers 54-1 and 54-2 associated with the intention of the user's voice command have been identified.

The display device 100 may receive, from the first air purifier 54-1, the air quality state information in the living room measured by the first air purifier 54-1 and may receive, from the second air purifier 54-2, the air quality state information in the main room measured by the second air purifier 54-2.

The display device 100 may generate recommended operation information which guides to turn on the operation of the first air purifier 54-1, in order to improve the air quality state in the living room in a case where the air quality state in the living room is in a bad state and the air quality state of the main room is in a good state.

The display device 100 may display the information 1100 including the weather information 1110 received from the external server, the air quality state information 1130 in the living room measured by the first air purifier 54-1, the air quality state information 1150 in the main room measured by the second air purifier 54-2, and the recommended operation information 1170 for recommending operation of the first air purifier 54-1 on the display unit 180.

When the user utters the voice command <Ok>, the display device 100 may determine that the user agrees to the recommended operation information 1170.

The display device 100 may transmit a control command for turning on the operation of the first air purifier 54-1 to the first air purifier 54-1 through the wireless communication unit 173.

The first air purifier 54-1 may turn on the operation thereof according to a control command received from the display device 100.

As such, according to an embodiment of the present disclosure, as one of the home appliances of the same type associated with the intention of the voice command is operated according to the situation in the house, the user's convenience can be greatly improved.

According to an embodiment of the present disclosure, the above-described method can be implemented with codes readable by a processor on a medium in which a program is recorded. Examples of the medium readable by the processor include a ROM, a RAM, a CD-ROM, a magnetic tape, a floppy disk, an optical data storage device, and the like, and can include those implemented in the form of carrier wave (for example, transmission over Internet).

The display device described above is not limitedly applicable to the configuration and method of the above-described embodiments, and the embodiments are configured by selectively combining all or part of each of the embodiments such that various modifications can be made.

The invention claimed is:

1. A display device comprising:
a display;
a wireless communication unit configured to wirelessly communicate with a home appliance; and
a control unit configured to:
receive a voice command,
obtain an analysis result comprising an intention of the received voice command and,
identify one or more home appliances associated with the obtained analysis result,
receive intention analysis information according to the intention from an external server or the one or more home appliances,
receive state information of the one or more home appliances from the identified one or more home appliances through the wireless communication unit,
based on the received state information and the analysis result of the voice command, generate recommended operation information for a recommended operation of the identified one or more home appliances, and
display, on the display, intention analysis information according to the intention of the voice command, the state information, and the recommended operation information for confirmation to perform operation of the identified one or more home appliances according to the recommended operation, based on analysis results of the intention.

2. The display device of claim 1,
wherein the control unit is further configured to identify one or more home appliances capable of providing information indicated by the intention among a plurality of home appliances provided in a house.

3. The display device of claim 1,
wherein the control unit is further configured to:
identify one or more home appliances capable of controlling information indicated by the intention among a plurality of home appliances provided in a house.

4. The display device of claim 1,
wherein the state information of the one or more home appliances includes at least one of measurement information measured by each home appliance and operation information related to operation of each home appliance.

5. The display device of claim 4,
wherein the control unit generates the recommended operation information for controlling operation of the one or more home appliances in a case where it is determined that a change in an environment in a house is necessary based on the measurement information.

6. The display device of claim 1,
wherein the control unit is further configured to receive an additional voice command according to a request for a recommended operation, and
transmit a control command based on the recommended operation information for the recommended operation to the one or more home appliances through the wireless communication unit, upon receiving the request for the recommended operation.

7. The display device of claim 1,
wherein the control unit identifies one or more home appliances that provide information on air quality state among a plurality of home appliances in a house, in a case where the intention is to provide weather information.

8. A display device comprising:
a display;
a network interface unit configured to communicate with an artificial intelligence server;
a microphone configured to receive voice commands; and
a control unit configured to:
transmit a received voice command to the artificial intelligence server,
receive, from the artificial intelligence server, intention analysis information that is a result of analyzing an intention of the voice command, state information of one or more home appliances associated with the intention, and recommended operation information for a recommended operation of the one or more home appliances generated based on the state information of the one or more home appliances and the result of analyzing the intention of the voice command, and display, on the display, the intention analysis information according to the intention of the voice command, the state information, and the recommended operation information for confirmation to perform operation of the one or more home appliances according to the recommended operation.

9. The display device of claim 8, wherein the recommended operation information includes information for guiding operation of the one or more home appliances to perform an operation associated with the intention of the voice command.

10. The display device of claim 8, wherein the state information of the one or more home appliances includes at least one of measurement information measured by each home appliance and operation information related to operation of each home appliance.

11. The display device of claim 8, wherein the control unit is further configured to:

receive an additional voice command according to a request for a recommended operation through the microphone, and transmit a control command based on the recommended operation information for the recommended operation to the artificial intelligence server, upon receiving request for the recommended operation.

12. The display device of claim 8, wherein, in a case where the intention of the voice command is to provide weather information, the intention analysis information is weather information, the state information is an indoor air quality state measured by an air purifier, and the recommended operation information is information that guides to turn on operation of the air purifier.

13. The display device of claim 8, wherein, in a case where the intention of the voice command is to provide weather information, the intention analysis information is weather information, the state information includes an indoor air quality state measured by an air purifier and a temperature measured by an air conditioner, and the recommended operation information is information that turns on operation of the air purifier and guides an operation mode of the air conditioner to operate in a cooling mode.

14. The display device of claim 1, wherein the one or more home appliances comprise a first home appliance and a second home appliance, and the control unit is further configured to:

identify the first home appliance and the second home appliance associated with the obtained analysis result, receive a first state information of the first home appliance from the first home appliance through the wireless communication unit, based on the received first state information, obtain a first recommended operation information of the first home appliance, receive a second state information of the second home appliance from the second home appliance, and based on the received second state information, obtain a second recommended operation information of the second home appliance.

15. The display device of claim 8, wherein the one or more home appliances comprise a first home appliance and a second home appliance, and the control unit is further configured to:

receive, from the artificial intelligence server, a first state information of the first home appliance from the first home appliance through the network interface unit, based on the received first state information, receive, from the artificial intelligence server, a first recommended operation information of the first home appliance, receive, from the artificial intelligence server, a second state information of the second home appliance from the second home appliance, and based on the received second state information, receive, from the artificial intelligence server, a second recommended operation information of the second home appliance.

* * * * *